United States Patent

Hamano

Patent Number: 5,774,275
Date of Patent: Jun. 30, 1998

[54] VARIABLE MAGNIFICATION VIEWFINDER

[75] Inventor: Hiroyuki Hamano, Kanagawa-ken, Japan

[73] Assignee: Canon Kabushiki Kaisha, Tokyo, Japan

[21] Appl. No.: 513,557

[22] Filed: Aug. 10, 1995

[30] Foreign Application Priority Data

Aug. 30, 1994 [JP] Japan .................................. 6-230781
Oct. 31, 1994 [JP] Japan .................................. 6-290436

[51] Int. Cl.$^6$ .................................................. G02B 15/14
[52] U.S. Cl. ........................................................ 359/687
[58] Field of Search ...................... 359/684, 687, 359/774

[56] References Cited

U.S. PATENT DOCUMENTS

| 4,832,471 | 5/1989 | Hamano ................................. 350/427 |
| 4,934,796 | 6/1990 | Sugiura et al. ......................... 350/427 |
| 4,988,174 | 1/1991 | Horiuchi et al. ....................... 350/427 |
| 5,009,492 | 4/1991 | Hamano ................................. 350/427 |
| 5,050,972 | 9/1991 | Mukaiya et al. ....................... 359/683 |
| 5,134,524 | 7/1992 | Hamano et al. ........................ 359/687 |
| 5,138,492 | 8/1992 | Hamano et al. ........................ 359/684 |
| 5,299,064 | 3/1994 | Hamano et al. ........................ 359/684 |
| 5,430,576 | 7/1995 | Hamano ................................. 359/684 |
| 5,448,400 | 9/1995 | Kikuchi et al. ........................ 359/422 |

FOREIGN PATENT DOCUMENTS 3-87803  4/1991  Japan .
5-341187 12/1993  Japan .

*Primary Examiner*—David C. Nelms
*Assistant Examiner*—Dawn-Marie Bey
*Attorney, Agent, or Firm*—Fitzpatrick, Cella, Harper & Scinto

[57] ABSTRACT

A variable magnification viewfinder is disclosed, comprising, from front to rear, at least a first lens unit of positive refractive power, a second lens unit of negative refractive power, a third lens unit, a fourth lens unit of positive refractive power and a fifth lens unit, wherein zooming is performed by varying air separations between every successive two of the lens units.

7 Claims, 13 Drawing Sheets

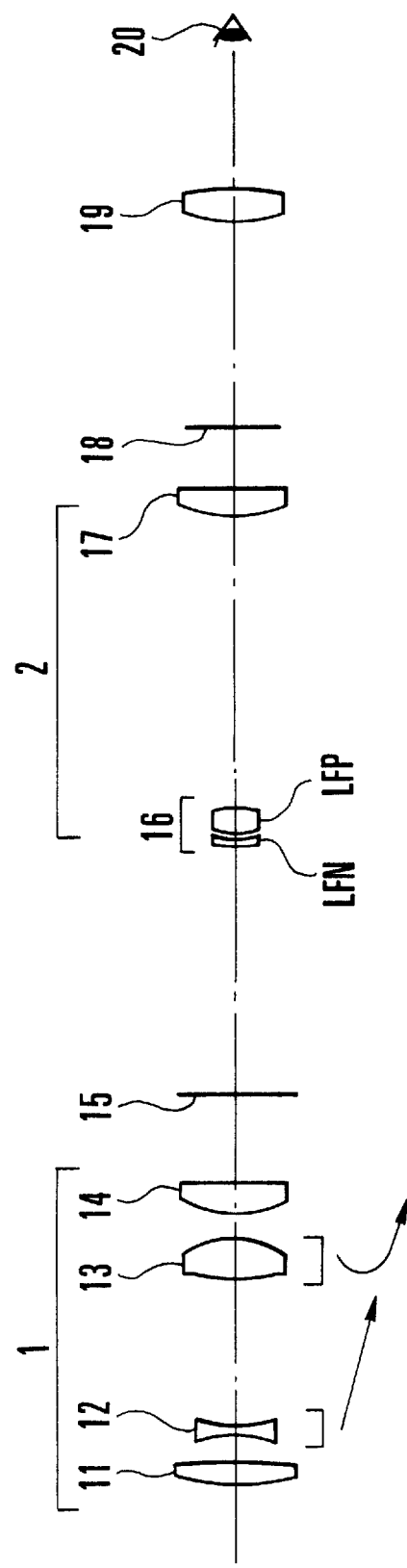

PUPIL DIAMETER 2.0

SPHERICAL ABERRATION

SEMI-FIELD ANGLE 10.4°

ASTIGMATISM

SEMI-FIELD ANGLE 10.4°

DISTORTION(%)

PUPIL DIAMETER 2.0

SPHERICAL ABERRATION

SEMI-FIELD ANGLE 10.4°

ASTIGMATISM

SEMI-FIELD ANGLE 10.4°

DISTORTION(%)

FIG.4A
PUPIL DIAMETER 2.0 d-LINE
g-LINE

-2.00    2.00
SPHERICAL ABERRATION

FIG.4B
SEMI-FIELD ANGLE 10.4°

ΔS
ΔM

-2.00    2.00
ASTIGMATISM

FIG.4C
SEMI-FIELD ANGLE 10.4°

-5.00    5.00
DISTORTION(%)

FIG.5A
PUPIL DIAMETER 2.0 d-LINE
g-LINE

-2.00    2.00
SPHERICAL ABERRATION

FIG.5B
SEMI-FIELD ANGLE 10.4°

ΔS
ΔM

-2.00    2.00
ASTIGMATISM

FIG.5C
SEMI-FIELD ANGLE 10.4°

-5.00    5.00
DISTORTION(%)

PUPIL DIAMETER 2.0

-2.00    2.00
SPHERICAL ABERRATION

SEMI-FIELD ANGLE 10.4°

-2.00    2.00
ASTIGMATISM

SEMI-FIELD ANGLE 10.4°

-5.00    5.00
DISTORTION(%)

PUPIL DIAMETER 2.0

-2.00    2.00
SPHERICAL ABERRATION

SEMI-FIELD ANGLE 10.4°

-2.00    2.00
ASTIGMATISM

SEMI-FIELD ANGLE 10.4°

-5.00    5.00
DISTORTION(%)

PUPIL DIAMETER 2.0

SPHERICAL ABERRATION

SEMI-FIELD ANGLE 10.4°

ASTIGMATISM

SEMI-FIELD ANGLE 10.4°

DISTORTION(%)

PUPIL DIAMETER 2.0

SPHERICAL ABERRATION

SEMI-FIELD ANGLE 10.4°

ASTIGMATISM

SEMI-FIELD ANGLE 10.4°

DISTORTION(%)

PUPIL DIAMETER 2.0

-2.00    2.00
SPHERICAL ABERRATION

SEMI-FIELD ANGLE 10.4°

-2.00    2.00
ASTIGMATISM

SEMI-FIELD ANGLE 10.4°

-5.00    5.00
DISTORTION(%)

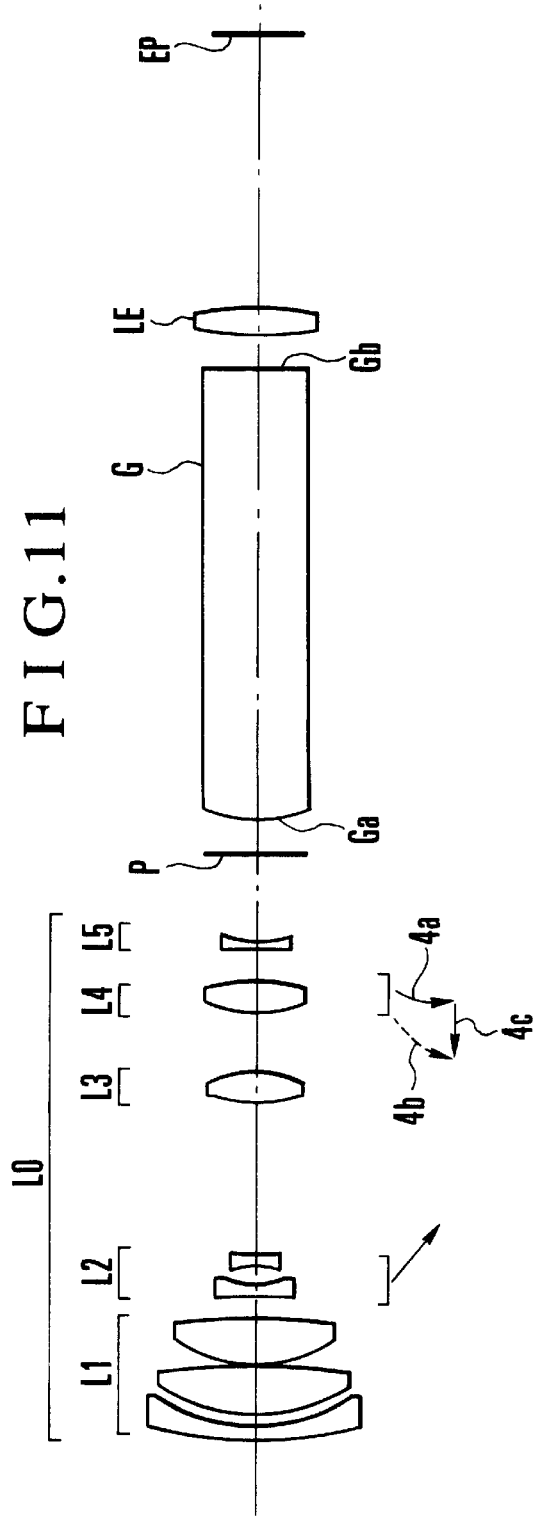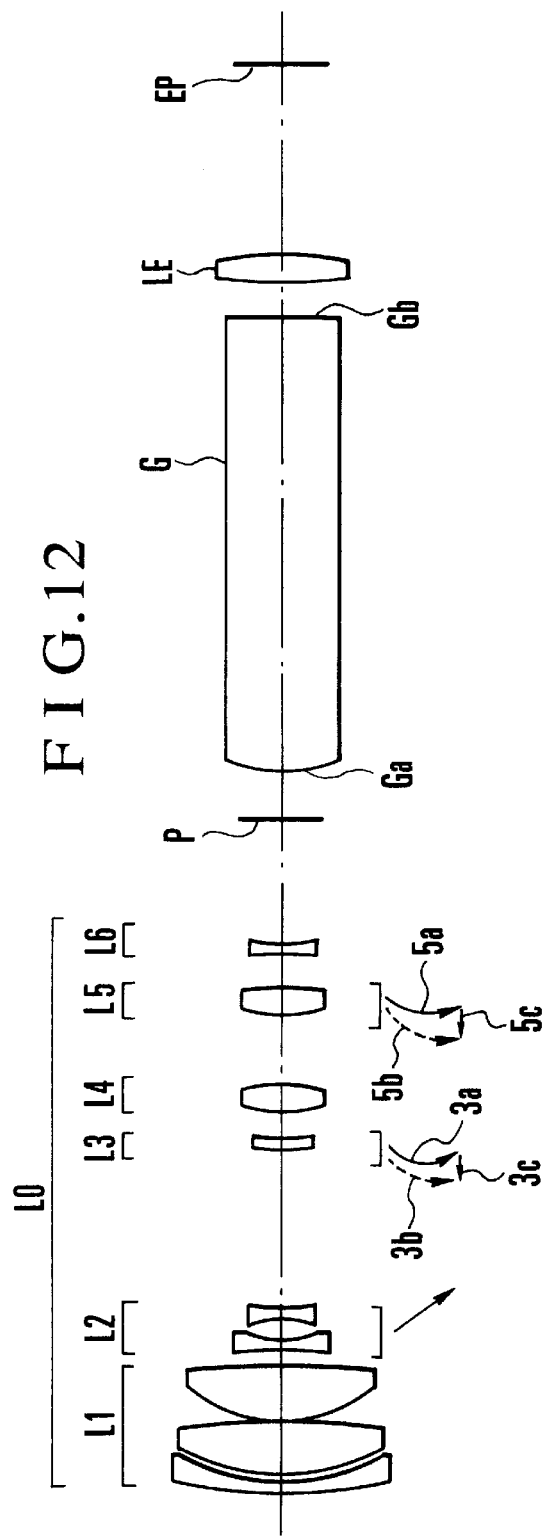

PUPIL RADIUS h=1.30

SPHERICAL ABERRATION
(diop)

SEMI-FIELD ANGLE ω=7.0°

ASTIGMATISM
(diop)

SEMI-FIELD ANGLE ω=7.0°

DISTORTION(%)
(diop)

PUPIL RADIUS h=3.32

SPHERICAL ABERRATION
(diop)

SEMI-FIELD ANGLE ω=7.0°

ASTIGMATISM
(diop)

SEMI-FIELD ANGLE ω=7.0°

DISTORTION(%)
(diop)

FIG.15A
PUPIL RADIUS h=5.56
F-LINE
d-LINE
-2.00    2.00
SPHERICAL ABERRATION
(diop)
FIG.15B
SEMI-FIELD ANGLE ω=7.0°
ΔS
ΔM
-2.00    2.00
ASTIGMATISM
(diop)
FIG.15C
SEMI-FIELD ANGLE ω=7.0°
-5.00    5.00
DISTORTION(%)
(diop)
FIG.16A
PUPIL RADIUS h=0.90
d-LINE
F-LINE
-2.00    2.00
SPHERICAL ABERRATION
(diop)
FIG.16B
SEMI-FIELD ANGLE ω=7.0°
ΔS
ΔM
-2.00    2.00
ASTIGMATISM
(diop)
FIG.16C
SEMI-FIELD ANGLE ω=7.0°
-5.00    5.00
DISTORTION(%)
(diop)
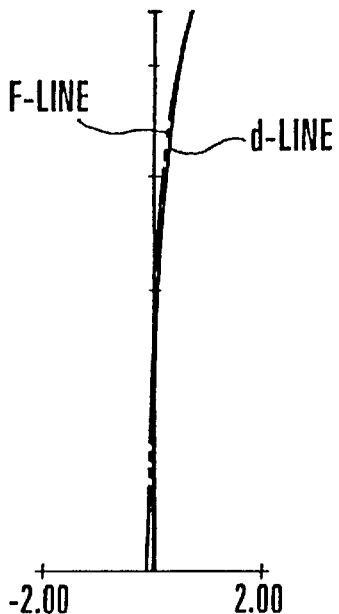
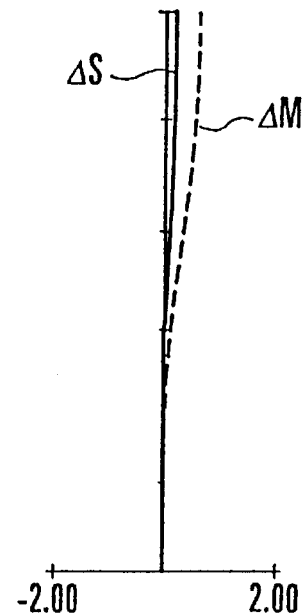
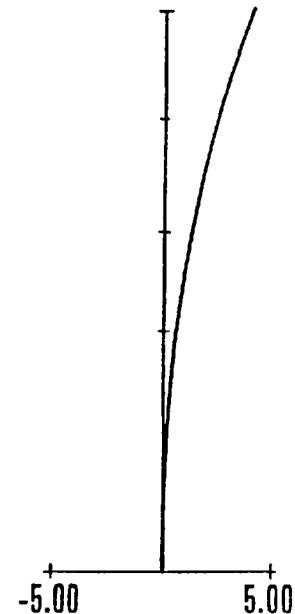
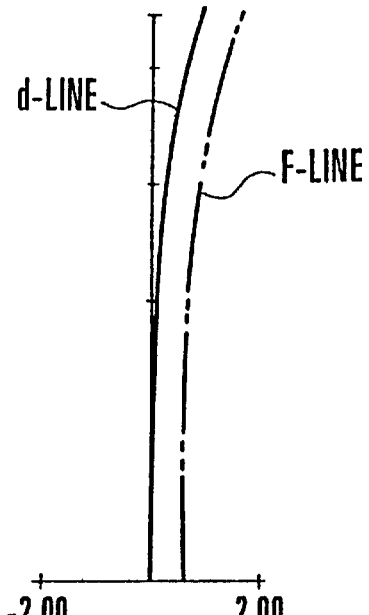
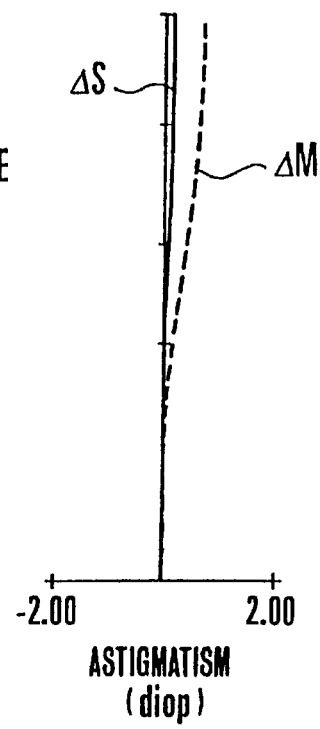
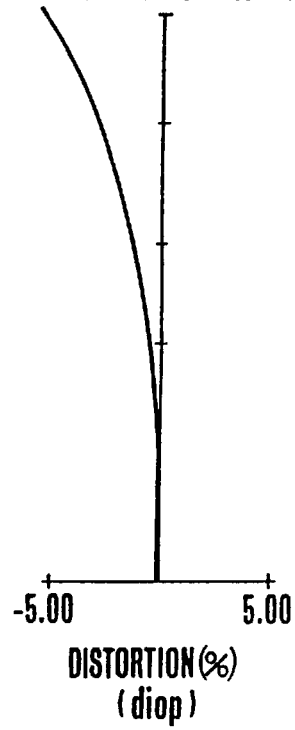

PUPIL RADIUS h=2.19

SPHERICAL ABERRATION (diop)

SEMI-FIELD ANGLE ω=7.0°

ASTIGMATISM (diop)

SEMI-FIELD ANGLE ω=7.0°

DISTORTION(%) (diop)

PUPIL RADIUS h=5.25

SPHERICAL ABERRATION (diop)

SEMI-FIELD ANGLE ω=7.0°

ASTIGMATISM (diop)

SEMI-FIELD ANGLE ω=7.0°

DISTORTION(%) (diop)

PUPIL RADIUS h=0.82

SPHERICAL ABERRATION
(diop)

SEMI-FIELD ANGLE ω=6.93°

ASTIGMATISM
(diop)

SEMI-FIELD ANGLE ω=6.93°

DISTORTION(%)
(diop)

PUPIL RADIUS h=2.31

SPHERICAL ABERRATION
(diop)

SEMI-FIELD ANGLE ω=6.93°

ASTIGMATISM
(diop)

SEMI-FIELD ANGLE ω=6.93°

DISTORTION(%)
(diop)

FIG.21A
PUPIL RADIUS h=5.20 d-LINE
F-LINE

-2.00   2.00
SPHERICAL ABERRATION
(diop)

FIG.21B
SEMI-FIELD ANGLE ω=6.93°

ΔS
ΔM

-2.00   2.00
ASTIGMATISM
(diop)

FIG.21C
SEMI-FIELD ANGLE ω=6.93°

-5.00   5.00
DISTORTION(%)
(diop)

FIG.22A
PUPIL RADIUS h=0.78 d-LINE
F-LINE

-2.00   2.00
SPHERICAL ABERRATION
(diop)

FIG.22B
SEMI-FIELD ANGLE ω=7.0°

ΔS
ΔM

-2.00   2.00
ASTIGMATISM
(diop)

FIG.22C
SEMI-FIELD ANGLE ω=7.0°

-5.00   5.00
DISTORTION(%)
(diop)

PUPIL RADIUS h=2.24

SPHERICAL ABERRATION
(diop)

SEMI-FIELD ANGLE ω=7.0°

ASTIGMATISM
(diop)

SEMI-FIELD ANGLE ω=7.0°

DISTORTION(%)
(diop)

PUPIL RADIUS h=4.98

SPHERICAL ABERRATION
(diop)

SEMI-FIELD ANGLE ω=7.0°

ASTIGMATISM
(diop)

SEMI-FIELD ANGLE ω=7.0°

DISTORTION(%)
(diop)

VARIABLE MAGNIFICATION VIEWFINDER

BACKGROUND OF THE INVENTION

1. Field of the Invention

This invention relates to viewfinder optical systems of variable magnification and, more particularly, to viewfinder optical systems for use in disunited form from the photographic systems (photographic lenses), or of the external type. Still more particularly, it relates to real-image viewfinder optical systems of variable magnification which have made it possible to observe excellent finder images at a series of magnifications by setting forth proper rules of lens design and which are suited to be used in, for example, still cameras or video cameras.

2. Description of the Related Art

It has been known to provide a camera with a viewfinder in disunited relation from its photographic system. For such a camera, if the photographic system is a zoom lens, it is preferred, on the point of view of making better photographs, to construct its viewfinder in the form that the field of view to cover, or the magnifying power, varies in response to zooming. Since the variable magnification viewfinder must be built in the camera, it is also preferred that its size is small and, nonetheless, its configuration is amenable to easy techniques of obtaining the predetermined ratio of variation of the magnification.

It is also preferred to employ, among other types of variable magnification viewfinder optical systems, the real-image one that an objective lens of positive refractive power forms a finder image on the focal plane thereof, or a first focal plane. This image, after having been reversed by a Porro prism or like means, is observed through an eyepiece lens. This arrangement permits a field mask to be positioned on the first focal plane, giving a merit that the observer, even if changing the position of his or her pupil, can clearly view the finder field up to the marginal zone thereof.

An example of a variable magnification viewfinder optical system of the real image type is disclosed in Japanese Laid-Open Pat. Application No. Hei 3-87803, where the objective lens is constructed with four lens units, as comprising first, second, third and fourth lens units of positive, negative, positive and positive refractive powers in this order from the object side, wherein the second and third lens units are made axially movable for varying the magnifying power.

Another example of the objective lens in Japanese Laid-Open Pat. Application No. Hei 5-341187 is constructed with first, second, third and fourth lens units of positive, negative, positive and positive refractive powers in this order from the object side, wherein the magnifying power is varied by axially moving the second and fourth lens units.

Recently, in developing video cameras of the type having liquid crystal monitors made associated therewith, there is a trend that, for the viewfinder system, in view of consuming as little electric power as possible, the optical type is more favored than the electronic one. With the use of the optical type in variable magnification viewfinders, what has become required are that the ratio of variation of the magnifying power has almost the same value as that of the zoom ratio of the photographic lens and that the lens system is entirely small in bulk and size.

For example, in the video cameras, there is a demand for the viewfinder optical system whose magnifying power varies up to about six times and which is of compact form. To achieve an increase of the ratio of variation of the magnifying power, it has been the common practice to employ one of the methods of strengthening the refractive powers of those lens units which vary the magnification, of extending every one of the zooming movements and of increasing the number of movable lens units.

However, strengthening of the refractive power of each lens unit causes extension of the range of variation of aberrations with zooming, which in turn causes increase of the difficulty of obtaining high optical performance throughout the entire zooming range. Also, when either the movement of the lens unit for zooming or the number of movable lens units is increased, a problem arises in that, as the total length increases, the entirety of the viewfinder system increases in size unduly largely.

SUMMARY OF THE INVENTION

The present invention is to set forth proper rules of design for the objective lens that has the section of varying the magnifying power. It is, therefore, an object of the invention to provide a real-image variable magnification viewfinder optical system whose lens structure is in a relatively simple form and which has as high a ratio of variation of the magnifying power as 3 to 6 or thereabout, while still permitting a high optical performance to be maintained throughout the entire zooming range. Such an optical system is suited to be used in, for example, the still video camera or video camera.

A feature of the invention is that an optical system for the variable magnification viewfinder comprises, from front to rear, a first lens unit having a positive refractive power and composed of a single lens element, a second lens unit having a negative refractive power and composed of a single lens element, a third lens unit having a positive refractive power and composed of a single lens element, and a fourth lens unit having a positive refractive power and composed of a single lens element, wherein zooming is performed by moving the second and third lens units, or that an optical system for the variable magnification viewfinder comprises, from front to rear, at least a first lens unit of positive refractive power, a second lens unit of negative refractive power, a third lens unit, a fourth lens unit of positive refractive power, and a fifth lens unit, wherein zooming is performed by varying air separations between every successive two of the lens units.

This and other features will become apparent from the following description taken in conjunction with the drawings.

BRIEF DESCRIPTION OF THE DRAWINGS

FIG. 1 is a lens block diagram of a numerical example 1 of the invention.

FIGS. 4A, 4B, and 4C shows-graphic representations of the aberrations of the numerical example 1 of the invention in the telephoto end.

FIGS. 5A, 5B, and 5C shows graphic representations of the aberrations of a numerical example 2 of the invention in the wide-angle end.

FIG. 11 is a lens block diagram of a numerical example 4 of the invention.

FIG. 12 is a lens block diagram of a numerical example 6 of the invention.

FIGS. 15A, 15B, and 15C shows graphic representations of the aberrations of the numerical example 4 of the invention in the telephoto end.

FIGS. 16A, 16B, and 16C shows graphic representations of the aberrations of a numerical example 5 of the invention in the wide-angle end.

FIGS. 21A, 21B, and 21C shows graphic representations of the aberrations of the numerical example 6 of the invention in the telephoto end.

FIGS. 22A, 22B, and 22C shows graphic representations of the aberrations of a numerical example 7 of the invention in the wide-angle end.

Figure 2A:
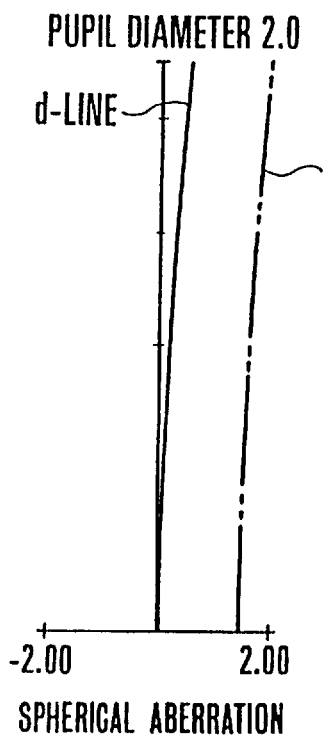
FIGS. 2A, 2B, and 2C shows graphic representations of the aberrations of the numerical example 1 of the invention in the wide-angle end.
Figure 2B:
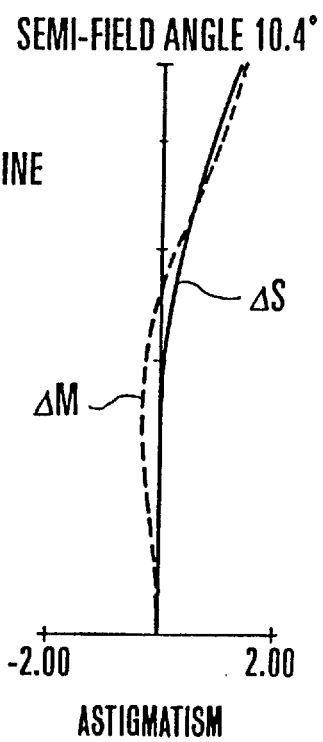
Figure 2C:
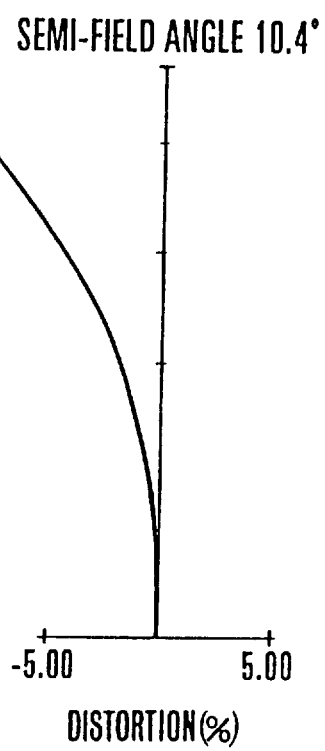
Figure 3A:
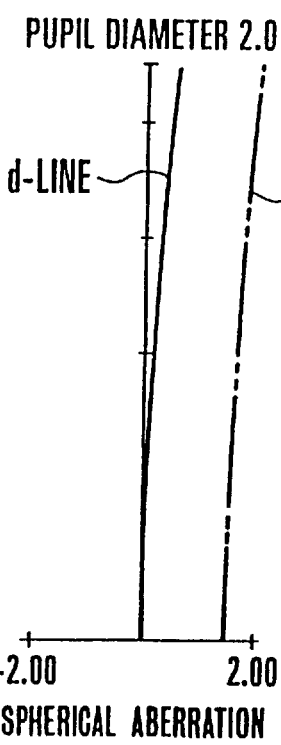
FIGS. 3A, 3B, and 3C shows graphic representations of the aberrations of the numerical example 1 of the invention in a middle focal length position.
Figure 3B:
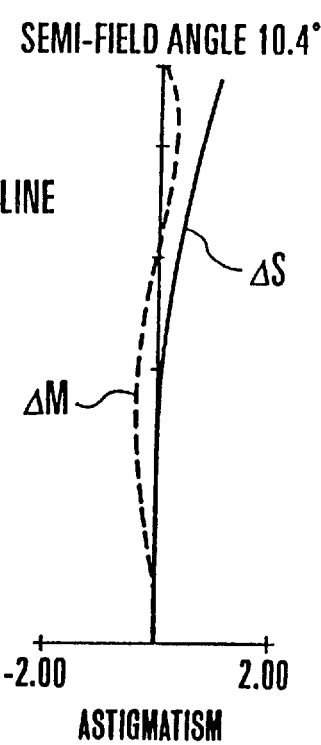
Figure 3C:
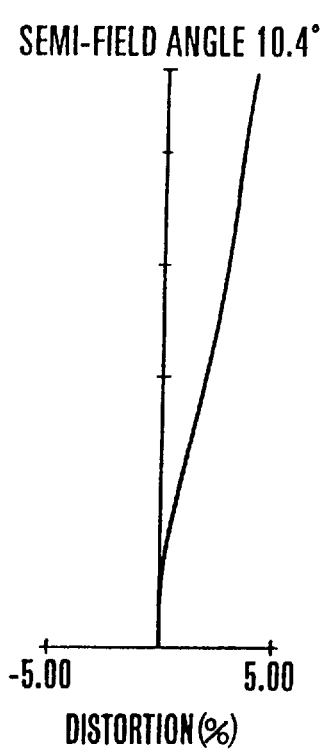
Figure 6A:
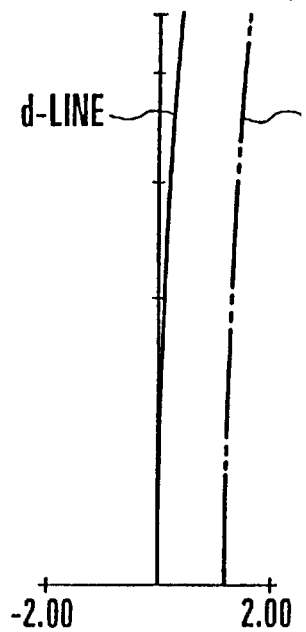
FIGS. 6A, 6B, and 6C shows graphic representations of the aberrations of the numerical example 2 of the invention in a middle focal length position.
Figure 6B:
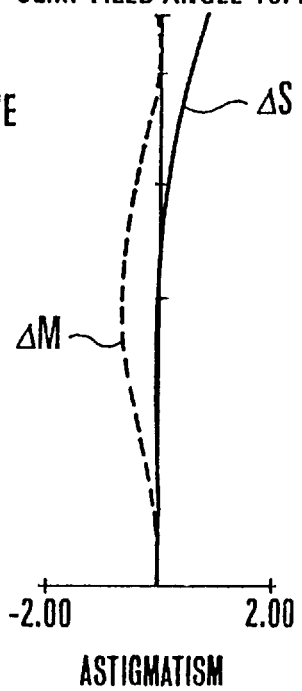
Figure 6C:
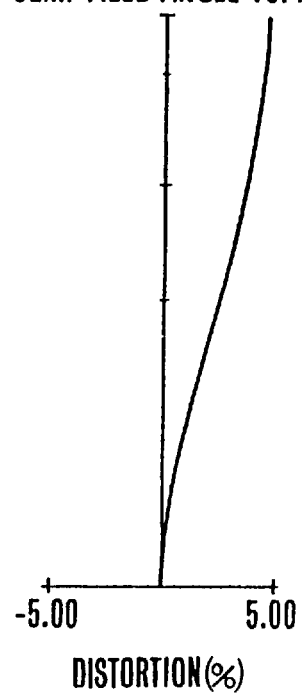
Figure 7A:
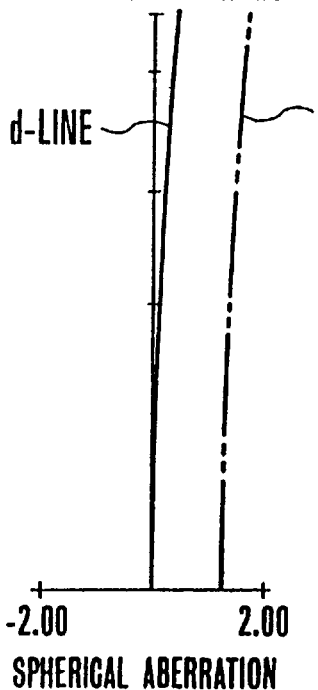
FIGS. 7A, 7B, and 7C shows graphic representations of the aberrations of the numerical example 2 of the invention in the telephoto end.
Figure 7B:
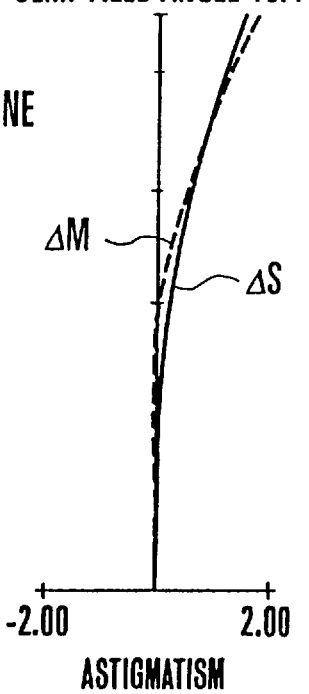
Figure 7C:
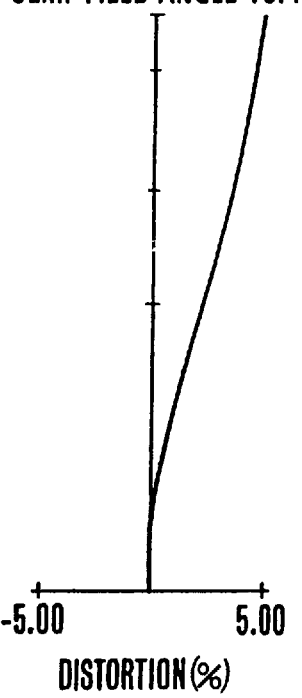
Figure 8A:
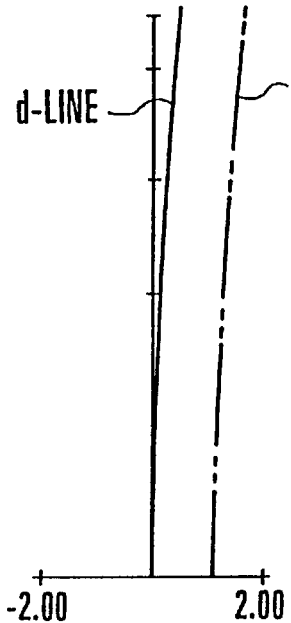
FIGS. 8A, 8B, and 8C shows graphic representations of the aberrations of a numerical example 3 of the invention in the wide-angle end.
Figure 8B:
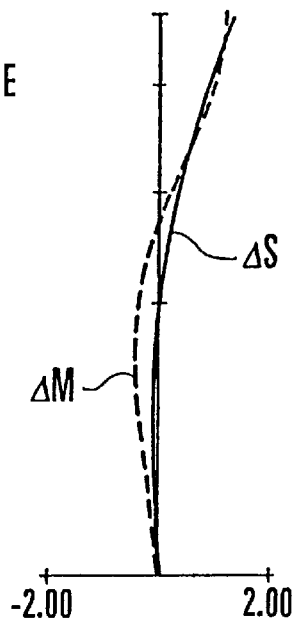
Figure 8C:
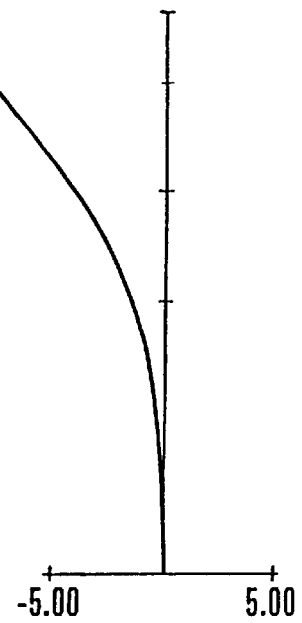
Figure 9A:
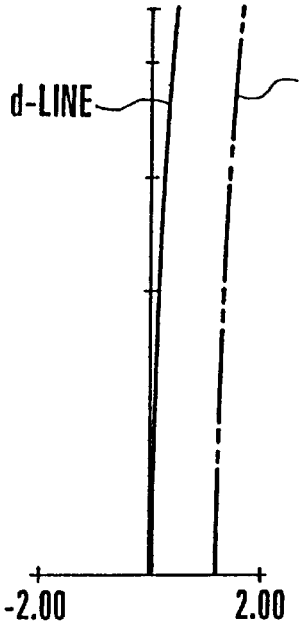
FIGS. 9A, 9B, and 9C shows-graphic representations of the aberrations of the numerical example 3 of the invention in a middle focal length position.
Figure 9B:
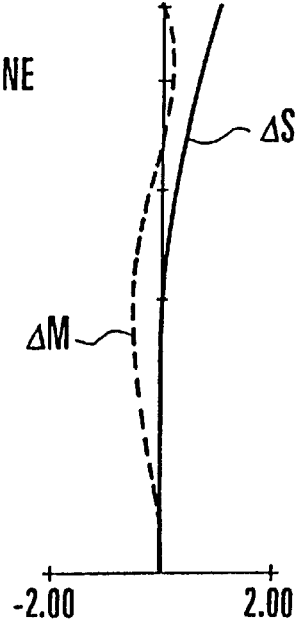
Figure 9C:
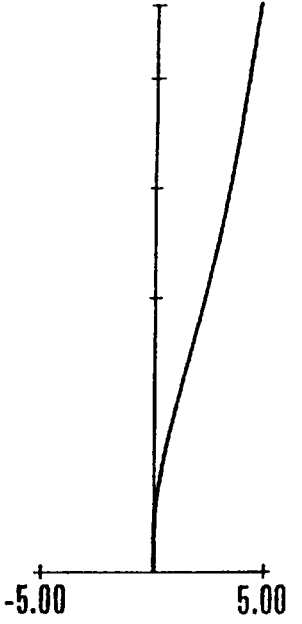
Figure 10A:
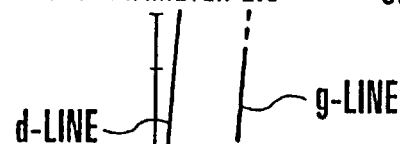
FIGS. 10A, 10B, and 10C shows graphic representations of the aberrations of the numerical example 3 of the invention in the telephoto end.
Figure 10B:
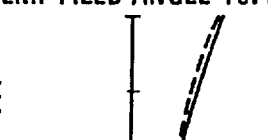
Figure 10C:
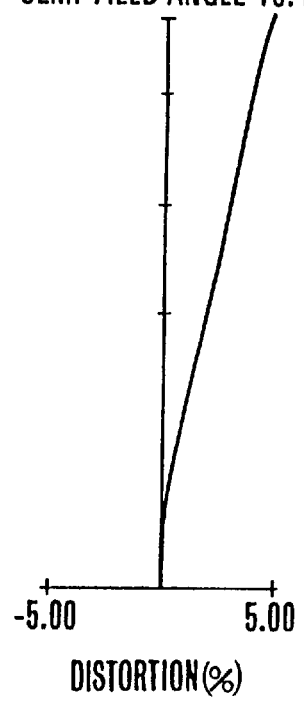
Figure 13A:
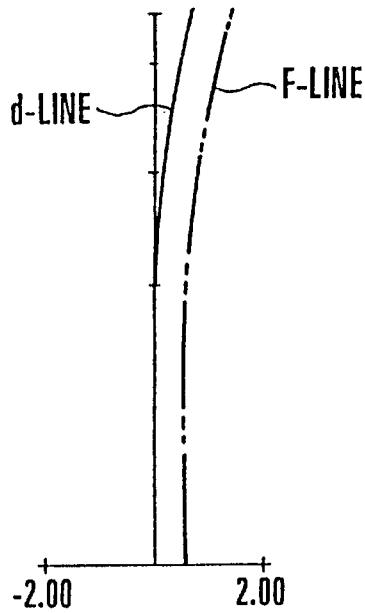
FIGS. 13A, 13B, and 13C shows graphic representations of the aberrations of the numerical example 4 of the invention in the wide-angle end.
Figure 13B:
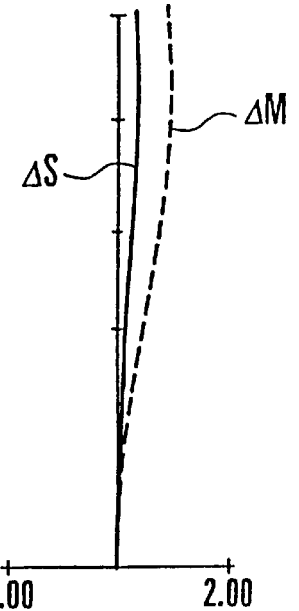
Figure 13C:
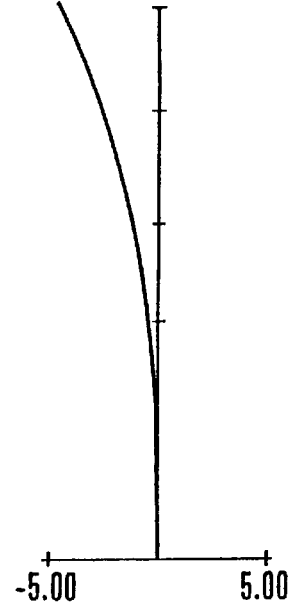
Figure 14A:
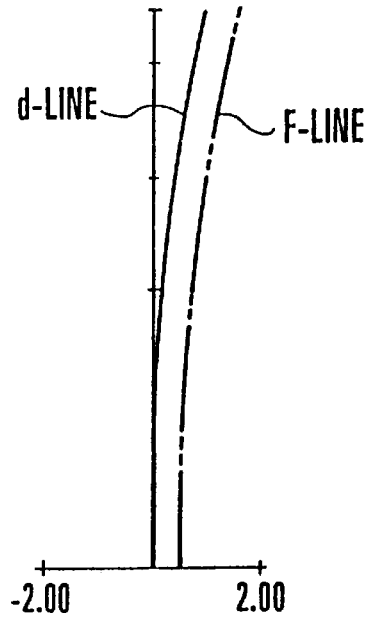
FIGS. 14A, 14B, and 14C shows graphic representations of the aberrations of the numerical example 4 of the invention in a middle focal length position.
Figure 14B:
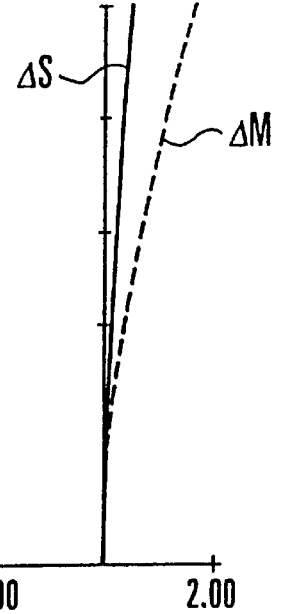
Figure 14C:
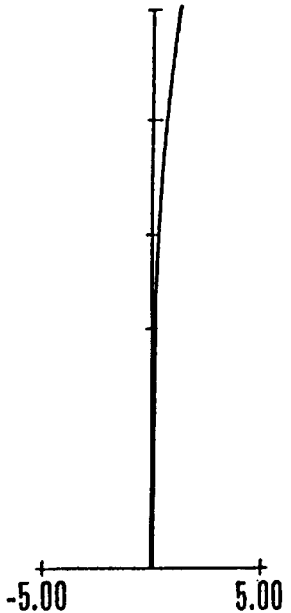
Figure 17A:
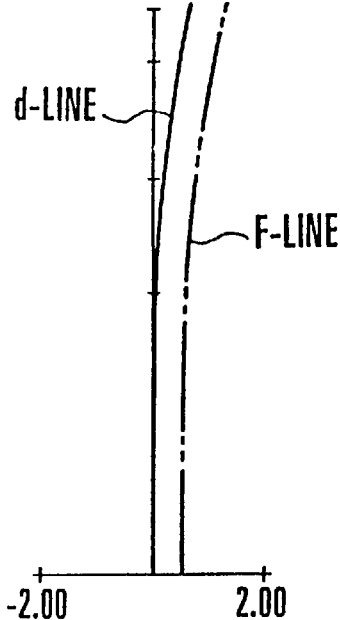
FIGS. 17A, 17B, and 17C shows graphic representations of the aberrations of the numerical example 5 of the invention in a middle focal length position.
Figure 17B:
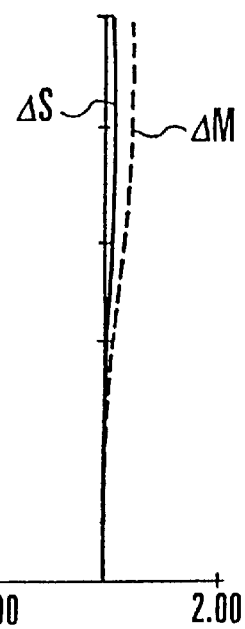
Figure 17C:
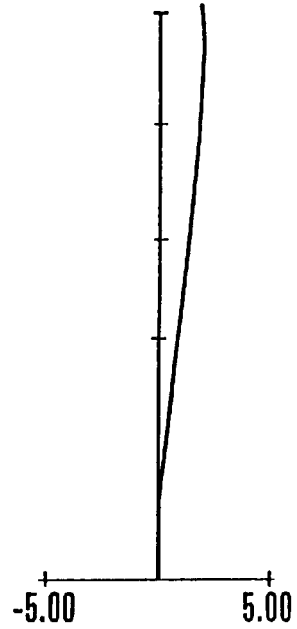
Figure 18A:
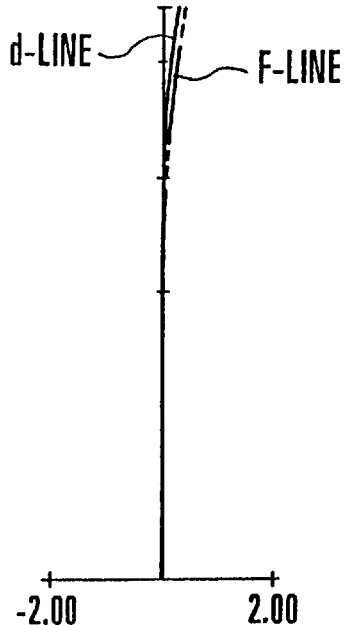
FIGS. 18A, 18B, and 18C shows graphic representations of the aberrations of the numerical example 5 of the invention in the telephoto end.
Figure 18B:
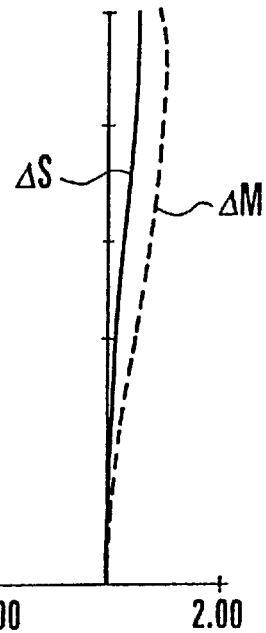
Figure 18C:
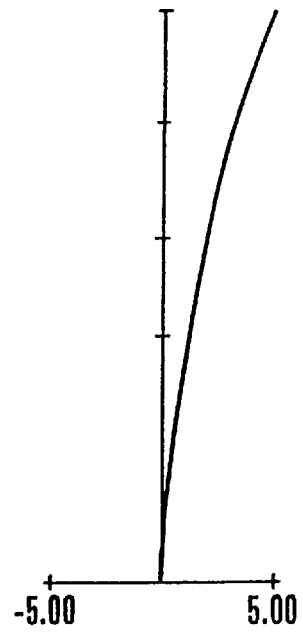
Figure 19A:
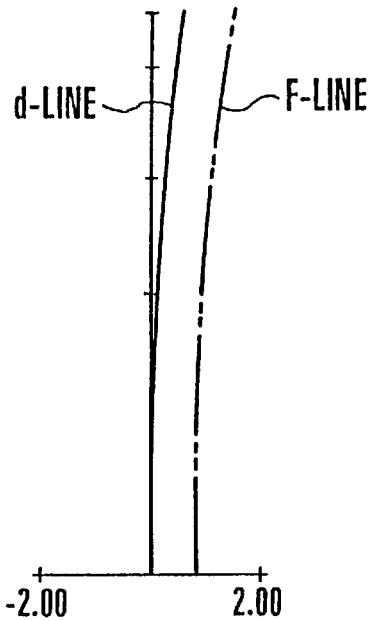
FIGS. 19A, 19B, and 19C shows graphic representations of the aberrations of the numerical example 6 of the invention in the wide-angle end.
Figure 19B:
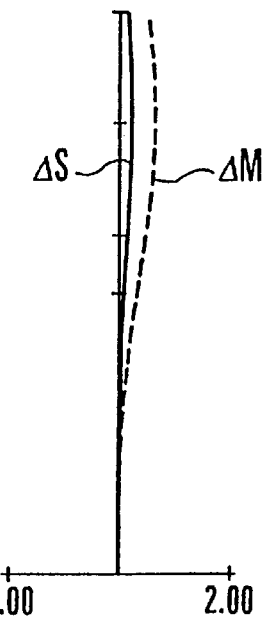
Figure 19C:
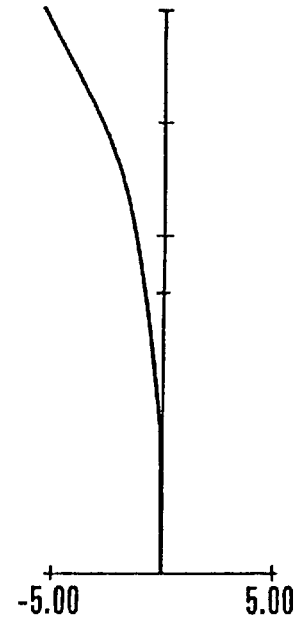
Figure 20A:
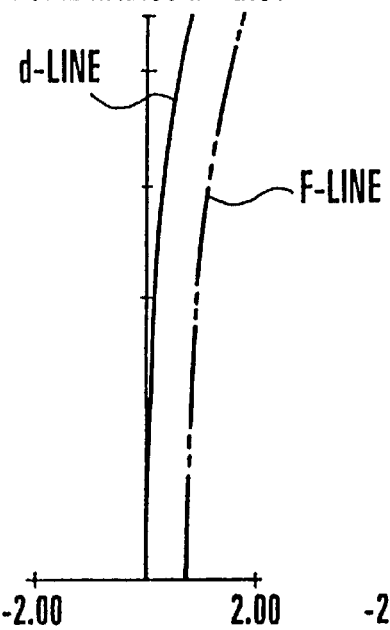
FIGS. 20A, 20B, and 20C shows graphic representations of the aberrations of the numerical example 6 of the invention in a middle focal length position.
Figure 20B:
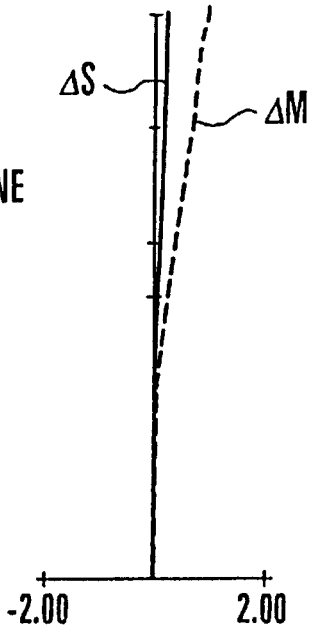
Figure 20C:
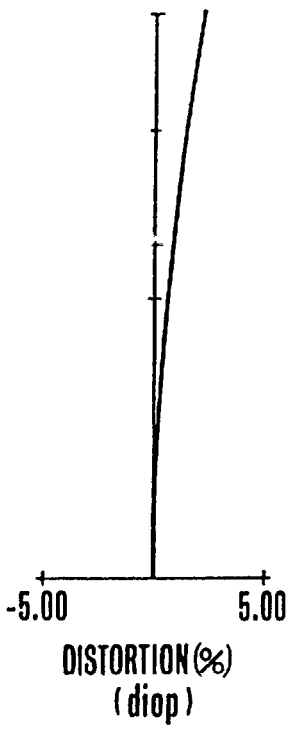
Figure 23A:
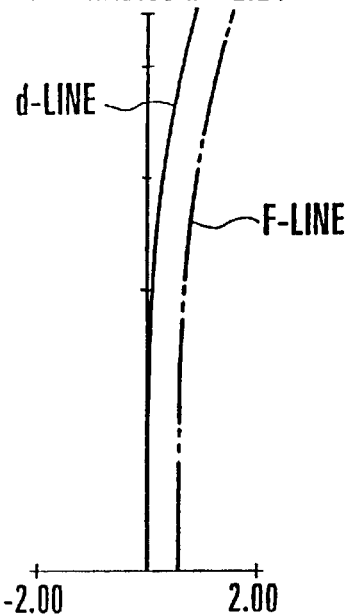
FIGS. 23A, 23B, and 23C shows graphic representations of the aberrations of the numerical example 7 of the invention in a middle focal length position.
Figure 23B:
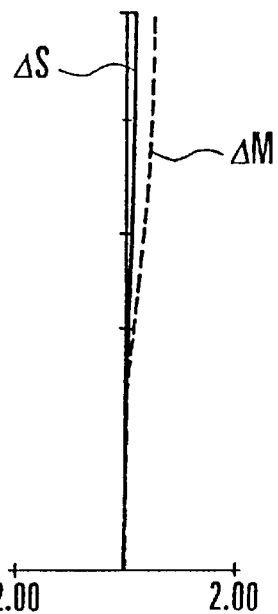
Figure 23C:
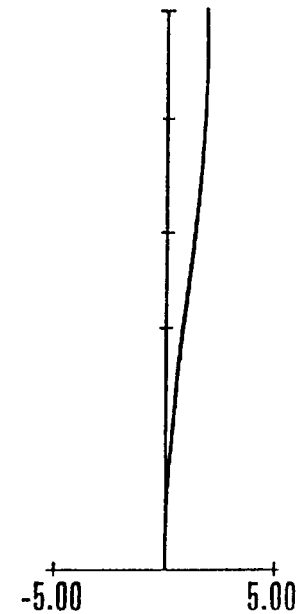
Figure 24A:
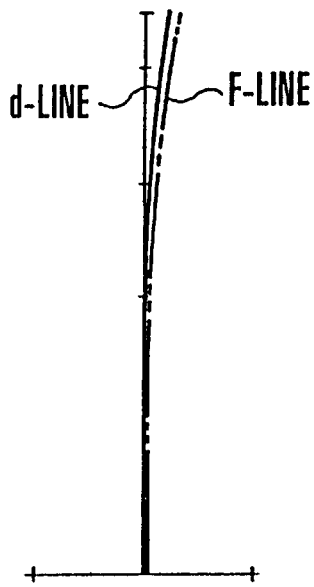
FIGS. 24A, 24B, and 24C shows graphic representations of the aberrations of the numerical example 7 of the invention in the telephoto end.
Figure 24B:
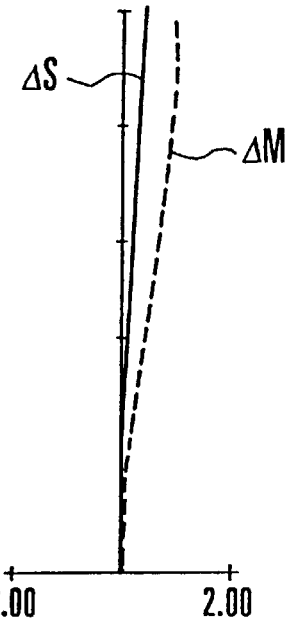
Figure 24C:
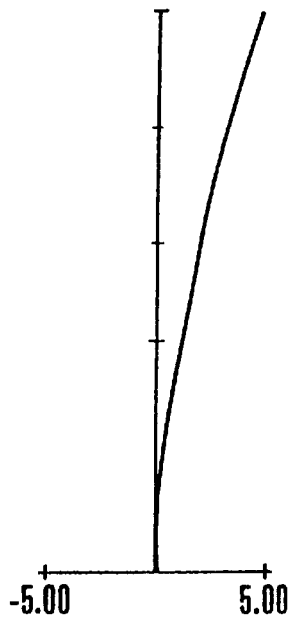

In the aberration curves, d stands for the spectral d-line, F for the spectral F-line, S for the sagittal image focus, M for the meridional image focus and h for the height of the pupil.

DETAILED DESCRIPTION OF THE PREFERRED EMBODIMENTS

FIG. 1 is a longitudinal section view of a variable magnification viewfinder optical system of the second image focus type of the numerical example 1 to be described later of the invention. In the figure, reference numeral 1 denotes an objective lens system containing a section of varying the magnification. This system comprises a first lens unit 11 of positive refractive power, a second lens unit 12 of negative refractive power for varying the magnification, or zooming, a third lens unit 13 of positive refractive power for compensating for the image shift with zooming and a fixed fourth lens unit 14 of positive refractive power. The first lens unit 11 comprises a positive lens element of which both surfaces are convex. The second lens unit 12 comprises a negative lens element of which both surfaces are concave. The third lens unit 13 comprises a positive lens element of which both surfaces are convex. The fourth lens unit 14 comprises a positive lens element having a convex surface facing the object side.

In the present embodiment, the first to fourth lens units each are constructed in the form of a single lens element made of a plastic material. This simplifies the entirety of the lens system. Zooming from the wide-angle end to the telephoto end is performed, as indicated by the arrows, by moving the second lens unit 12 toward the image side monotonically while simultaneously moving the third lens unit 13 so as to depict a locus convex toward the object side. This assures the predetermined zoom ratio to be obtained advantageously.

Reference numeral 15 denotes a first focal plane on which the objective lens system 1 forms an image of an object (or finder image). Reference numeral 2 denotes a second image forming lens system which focuses the light radiating from the image formed on the first focal plane 15 to form an image of the object again as a laterally reversed, erected image on a second focal plane 18.

The second image forming lens system 2 comprises an erector lens 16 and a field lens 17. The erector lens 16 is constructed with two lenses of different materials, as comprising a negative lens LFN of meniscus form convex toward the object side and a positive lens LFP of bi-convex form. Thus, chromatic aberrations are corrected well.

The field lens 17 is constructed in the single form with a positive lens having a convex surface facing the object side. The field lens 17 is positioned near the second focal plane 18 to thereby collect the light from the erector lens 16. Thus, the light is efficiently conducted to an eyepiece lens 19. The field lens 17 is made from the same material and formed to the same shape as those of the fourth lens unit 14 of the objective lens 1, thereby reducing the production cost. The eyepiece lens 19 is used to observe the laterally reversed, erected image of the object formed on the second focal plane 18. The eyepiece lens 19 is constructed in the single form with a positive lens of bi-convex form.

In the present embodiment, the eyepiece lens 19 is made axially movable for adjusting the eyesight. Reference numeral 20 denotes the observer's pupil position (eyepoint).

In the present embodiment, light from an object to be photographed is focused by the objective lens system 1 on the first focal plane 15 as an inverted object image (aerial image). A bundle of light rays from the object image on the first focal plane 15 is passed by the second image forming lens system 2, or the erector lens 16 and the field lens 17, to the second focal plane 18 on which an image of the object is formed again as is laterally reversed and erected. Then, a bundle of light rays from the object image on the second focal plane 18 is directed to the eyepiece lens 19. Thus, the observer who looks through the eyepiece lens 19 views the object image on the second focal plane 18 from the pupil position 20.

The above-described features suffice for accomplishing the objects of the invention. In order to further improve the variable magnification viewfinder optical system of the second image focus type in such a manner that the requirements of minimizing the size of the entire lens system and of observing the finder image of a good quality over the entire area of the field of view, it is recommended to satisfy at least one of the following features or conditions:

(1—1) Letting the shortest focal length of the entire objective lens system 1 be denoted by of and the focal length of the i-th lens unit by fi, the following conditions are satisfied:

$$1.2 < |f2/f0| < 1.7 \ldots \quad (1)$$

$$0.4 < f3/f4 < 0.6 \ldots \quad (2)$$

The inequalities of condition (1) are concerned with the negative refractive power of the second lens unit constituting part of the objective lens system and have an aim chiefly to simultaneously fulfill the requirements of minimizing the size of the objective lens system and of advantageously obtaining a predetermined zoom ratio of about 3.

When the lower limit of the condition (1) is exceeded, as this means that the negative refractive power of the second lens unit is too strong, the predetermined zoom ratio can be secured by a shorter movement, but it becomes difficult to correct well the variation with zooming of aberrations, particularly curvature of field. When the refractive power of the second lens unit is too weak, as exceeding the upper limit, the required movement for the predetermined zoom ratio increases to increase the size of the entirety of the objective lens system objectionably.

The inequalities of condition (2) are concerned with the ratio of the refractive power of the third lens unit for compensating for the image shift with zooming to the refractive power of the fourth lens unit, both constituting part of the objective lens system and have an aim chiefly to correct well the variation of spherical aberration with zooming.

When the lower limit of the condition (2) is exceeded, as this means that the refractive power of the third lens unit is too stronger than that of the fourth lens unit, it becomes difficult to correct spherical aberration throughout the entire zooming range. Conversely when the refractive power of the third lens unit is too weaker than that of the fourth lens unit, the zooming movement of the third lens unit increases to increase the size of the entirety of the objective lens system objectionably.

(1–2) As the second image forming lens system 2 contains the erector lens for re-forming the object image formed on the first focal plane to a laterally reversed, erected image and the field lens, and the aforesaid erector lens is constructed with the negative lens LFN and the positive lens LFP, the Abbe number $\upsilon_{LFN}$ of the material of the negative lens LFN lies in the following range:

$$\upsilon_{LEN} < 35 \ldots \quad (3)$$

The inequality of condition (3) is for correcting chromatic aberrations well. As the whole optical system is made from plastic materials, it is in that respect to choose a material of appropriate dispersion for use in the lens of negative refractive power that constitutes part of the erector lens. When the condition (3) is violated, it becomes difficult to correct well the entirety of the viewfinder optical system for longitudinal chromatic aberration and lateral chromatic aberration.

(1–3) As the second image forming lens system 2 contains the erector lens for re-forming the object image formed on the first focal plane to a laterally reversed, erected image and the field lens, letting the distance from that lens surface of the field lens which faces the observer side to the second focal plane be denoted by DL and the focal length of the eyepiece lens by fe, the following condition is satisfied:

$$0.2 < DL/fe < 0.4 \ldots \quad (4)$$

The field lens 17 of the second image forming lens system 2 has to collect the bundle of light rays from the erector lens 16 with a high efficiency and then to pass it to the eyepiece lens 19. To this end, it is in the general case that the field lens 17 is better positioned adjacent to the second focal plane 18. However, if it is too much near to the second focal plane 18, foreign particles on the surfaces of the field lens 17 are viewed together with the finder image. This should be avoided.

Therefore, in the invention, the values of the parameters are determined so as to satisfy the condition (4). Good observation of the finder image is thus ensured with the light bundle being used at a high efficiency. When the lower limit of the condition (4) is exceeded, as this means that the distance DL is too short, foreign particles become prominent objectionably when the finder image is observed. When the distance DL is too long as exceeding the upper limit, the ability to collect the light rays falls below a satisfactory level for the field lens. Also, the outer diameter of the field lens increases objectionably.

(1–4) It is preferable that at least one of the lens surfaces of the first lens unit in the objective lens system 1 is made aspheric of such shape that the positive refractive power gets progressively stronger as going from the lens center to the margin. According to this, distortion for the wide-angle end can be corrected well.

(1–5) It is preferable that at least one of the lens surfaces of the second lens unit in the objective lens system 1 is made aspheric of such shape that the negative refractive power gets progressively weaker as going from the lens center to the margin. According to this, the variation of distortion and astigmatism with zooming can be corrected well.

Next, numerical examples 1 to 3 of the invention are shown. In the numerical data for the examples 1 to 3, Ri is the radius of curvature of the i-th lens surface, when counted from the object side, Di is the i-th lens thickness or air separation, when counted from the object side and Ni and $\upsilon$i are respectively the refractive index and Abbe number of the material of the i-th lens element, when counted from the object side. The values of the factors in the above-described conditions (1) to (4) for the numerical examples 1 to 3 are listed in Table-1.

The shape of an aspheric surface is expressed in the coordinates with an X axis in the axial direction and an H axis in the perpendicular direction to an optical axis, the direction in which light advances being taken as positive, by the following equation:

$$X = \frac{(1/R)H^2}{1 + \sqrt{1 - (1+K)(H/R)^2}} + BH^4 + CH^6 + DH^8 + EH^{10}$$

where R is the radius of the osculating sphere, and K, B, C, D and E are the aspheric coefficients.

Also notice that the notation: D-OX means $10^{-X}$.

Numerical Example 1:
β = 0.38–1.03    2ω (Field Angle) = 20.8°

| | | | |
|---|---|---|---|
| R1 = Aspherical | D1 = 3.50 | N1 = 1.49171 | ν1 = 57.4 |
| R2 = −66.63 | D2 = Variable | | |
| R3 = Aspherical | D3 = 1.35 | N2 = 1.49171 | ν2 = 57.4. |
| R4 = Aspherical | D4 = Variable | | |
| R5 = 25.80 | D5 = 5.70 | N3 = 1.49171 | ν3 = 57.4 |
| R6 = Aspherical | D6 = Variable | | |
| R7 = 16.40 | D7 = 4.20 | N4 = 1.49171 | ν4 = 57.4 |
| R8 = −2102.91 | D8 = 31.14 | | |
| R9 = 18.13 | D9 = 1.00 | N5 = 1.58306 | ν5 = 30.2 |
| R10 = 10.83 | D10 = 0.65 | | |
| R11 = 13.27 | D11 = 3.45 | N6 = 1.49171 | ν6 = 57.4 |
| R12 = Aspherical | D12 = 38.38 | | |
| R13 = 16.40 | D13 = 4.20 | N7 = 1.49171 | ν7 = 57.4 |
| R14 = −2102.91 | D14 = 33.87 | | |
| R15 = Aspherical | D15 = 4.60 | N8 = 1.49171 | ν8 = 57.4 |
| R16 = −37.76 | D16 = 22.50 | | |
| R17 = Eyepoint | | | |

| Variable | Magnification | | |
|---|---|---|---|
| Separation | 0.38 | 0.79 | 1.03 |
| D2 | 2.84 | 10.48 | 18.12 |
| D4 | 16.41 | 4.76 | 1.84 |
| D6 | 3.18 | 7.20 | 2.47 |

| Aspheric Surface | R | K | B |
|---|---|---|---|
| R1 | 2.983 D + 01 | −8.051 D + 00 | 1.829 D − 05 |
| R3 | −1.213 D + 01 | −1.837 D + 00 | 2.548 D − 04 |
| R4 | 1.718 D + 01 | 3.960 D + 00 | 1.515 D − 05 |
| R6 | −1.088 D + 01 | −1.478 D + 00 | 2.464 0 − 05 |
| R12 | −1.488 D + 01 | 6.216 D − 01 | 4.860 D − 05 |
| R15 | 2.094 D + 01 | 1.534 D + 00 | −5.354 D − 05 |

| Aspheric Surface | C | D | E |
|---|---|---|---|
| R1 | 3.076 D − 07 | 2.076 D − 09 | — |
| R3 | −9.542 D − 06 | — | — |
| R4 | −6.474 D − 06 | — | — |
| R6 | −1.505 D − 06 | 2.092 D − 08 | −1.536 D − 11 |
| R12 | — | — | — |
| R15 | −4.522 D − 08 | − 4.010 D − 09 | — |

Numerical Example 2:
β = 0.34–0.90    2ω (Field Angle) = 20°

| | | | |
|---|---|---|---|
| R1 = Aspherical | D1 = 3.70 | N1 = 1.49171 | ν1 = 57.4 |
| R2 = −78.93 | D2 = Variable | | |
| R3 = Aspherical | D3 = 1.30 | N2 = 1.49171 | ν2 = 57.4 |
| R4 = Aspherical | D4 = Variable | | |
| R5 = 21.08 | D5 = 5.80 | N3 = 1.49171 | ν3 = 57.4 |
| R6 = Aspherical | D6 = Variable | | |
| R7 = 15.60 | D7 = 4.00 | N4 = 1.49171 | ν4 = 57.4 |
| R8 = −2000.00 | D8 = 41.12 | | |
| R9 = 24.61 | D9 = 1.00 | N5 = 1.58306 | ν5 = 30.2 |
| R10 = 10.93 | D10 = 0.60 | | |
| R11 = 12.06 | D11 = 3.30 | N6 = 1.49171 | ν6 = 57.4 |
| R12 = Aspherical | D12 = 33.79 | | |
| R13 = 15.60 | D13 = 4.00 | N7 = 1.49171 | ν7 = 57.4 |
| R14 = −2000.00 | D14 = 32.33 | | |
| R15 = Aspherical | D15 = 4.60 | N8 = 1.49171 | ν8 = 57.4 |
| R16 = −22.05 | D16 = 22.50 | | |
| R17 = Eyepoint | | | |

| Variable | Magnification | | |
|---|---|---|---|
| Separation | 0.34 | 0.71 | 0.90 |
| D2 | 2.42 | 9.84 | 17.27 |
| D4 | 15.94 | 4.33 | 1.87 |
| D6 | 2.82 | 7.01 | 2.04 |

| Aspheric Surface | R | K | B |
|---|---|---|---|
| R1 | 2.696 D + 01 | — | 6.360 D − 07 |
| R3 | −1.383 0 + 01 | −1.488 0 + 00 | 3.164 D − 04 |
| R4 | 1.401 D + 01 | 3.051 D + 00 | −6.825 D − 05 |
| R6 | −1.149 D + 01 | −1.196 D + OD | 9.426 D − 05 |
| R12 | −1.262 D + 01 | 2.879 D − 01 | 6.255 D − 05 |
| R15 | 3.320 D + 01 | 6.746 D + 00 | −7.071 D − 05 |

| Aspheric Surface | C | D | E |
|---|---|---|---|
| R1 | 3.912 D − 07 | 3.711 D − 10 | 2.921 D − 11 |
| R3 | −1.483 D − 05 | — | — |
| R4 | −1.041 D − 05 | — | — |
| R6 | −1.936 D − 06 | 3.032 D − 08 | −1.031 D − 10 |
| R12 | — | — | — |
| R15 | 4.258 D − 07 | −1.291 D − 08 | — |

Numerical Example 3:
β = 0.38–1.02    2ω (Field Angle) = 20.8°

| | | | |
|---|---|---|---|
| R1 = Aspherical | D1 = 3.60 | N1 = 1.49171 | ν1 = 57.4 |
| R2 = −65.72 | D2 = Variable | | |
| R3 = Aspherical | D3 = 1.35 | N2 = 1.49171 | ν2 = 57.4 |
| R4 = Aspherical | D4 = Variable | | |
| R5 = 26.99 | D5 = 5.60 | N3 = 1.49171 | ν3 = 57.4 |
| R6 = Aspherical | D6 = Variable | | |
| R7 = 16.22 | D7 = 4.15 | N4 = 1.49171 | ν4 = 57.4 |
| R8 = −2080.00 | D8 = 40.50 | | |
| R9 = 24.41 | D9 = 1.00 | N5 = 1.58306 | ν5 = 30.2 |
| R10 = 9.38 | D10 = 0.62 | | |
| R11 = 10.39 | D11 = 3.43 | N6 = 1.49171 | ν6 = 57.4 |
| R12 = Aspherical | D12 = 36.25 | | |
| R13 = 16.22 | D13 = 4.16 | N7 = 1.49171 | ν7 = 57.4 |
| R14 = −2080.00 | D14 = 32.99 | | |
| R15 = Aspherical | D15 = 4.60 | N8 = 1.49171 | ν8 = 57.4 |
| R16 = −27.46 | D16 = 22.50 | | |
| R17 = Eyepoint | | | |

| Variable | Magnification | | |
|---|---|---|---|
| Separation | 0.38 | 0.80 | 1.02 |
| D2 | 2.85 | 10.57 | 18.30 |
| D4 | 16.50 | 4.42 | 1.87 |
| D6 | 3.31 | 7.66 | 2.49 |

| Aspheric Surface | R | K | B |
|---|---|---|---|
| R1 | 3.061 D + 01 | −6.182 D + 00 | 1.059 D − 05 |
| R3 | −1.273 D + 01 | −2.025 D + 00 | 2.674 D − 04 |
| R4 | 1.675 D + 01 | 3.933 D + 00 | 2.569 D − 05 |
| R6 | −1.100 D + 01 | −1.520 D + 00 | 2.695 D − 05 |
| R12 | −1.234 D + 01 | 1.748 D − 01 | 5.224 D − 05 |
| R15 | 2.555 D + 01 | 2.387 D + 00 | −5.435 D − 05 |

| Aspheric Surface | C | D | E |
|---|---|---|---|
| R1 | 1.057 D − 07 | 3.481 D − 09 | — |
| R3 | −1.061 D − 05 | — | — |
| R4 | −7.558 D − 06 | — | — |
| R6 | −1.690 D − 06 | 2.162 D − 08 | −1.756 D − 11 |
| R12 | — | — | — |
| R15 | −3.272 D − 08 | −3.611 D − 09 | — |

TABLE 1

| Condition | Numerical Example | | |
|---|---|---|---|
| | 1 | 2 | 3 |
| (1) \|f2/f0\| | 1.473 | 1.475 | 1.475 |
| (2) f3/f4 | 0.495 | 0.510 | 0.510 |
| (3) $\nu_{LFN}$ | 30.2 | 30.2 | 30.2 |
| (4) DL/fe | 0.272 | 0.263 | 0.273 |

Another embodiment of the invention in which the variable magnification viewfinder is given higher magnifications than those in the foregoing embodiment is described below.

FIG. 11 and FIG. 12 are longitudinal section views of optical systems of the numerical examples 4 and 6 to be described later of the invention with the optical path expanded in part. In FIG. 11 and FIG. 12, an objective lens LO has a zoom section and forms an object image (finder image) on a first image plane P. Reference character G denotes image reversing means which is shown as comprising an entrance face Ga of predetermined positive refractive power and a Porro prism having reflection surfaces and total reflection surfaces (not shown). In FIG. 11 and FIG. 12, the optical path through the means G is shown in the expanded form by a block. Reference character LE denotes an eyepiece lens. Reference character EP denotes an eye point for observation.

In the present embodiment, the objective lens LO, because of having the zoom section, can form the finder image on the first image plane P at various magnifications, which is then erected by the image reversing means G. The erected finder image is observed through the eyepiece lens LE from the eye point EP.

It is to be noted that, in the present embodiment, the image reversing means G may otherwise be constructed with an erector lens or like second image forming lens. If so, the inverted image of the object on the first image plane P is laterally reversed and erected by the erector lens. The thus-formed finder image on a second image plane is observed through the eyepiece lens.

The characteristic features of the objective lens LO of FIG. 11 or FIG. 12 are next described below.

In FIG. 11, the objective lens LO is constructed with five lens units, as comprising a stationary first lens unit L1 of positive refractive power, a second lens unit L2 of negative refractive power for varying the magnification, a stationary third lens unit L3 of positive refractive power, a fourth lens unit L4 of positive refractive power which performs compensation for the image shift with zooming and focusing, and a stationary fifth lens unit L5 of negative refractive power.

In the present embodiment, when the photographic lens (not shown) is zoomed from the wide-angle end to the telephoto end, the second lens unit L2 correspondingly moves axially toward the image side as indicated by the arrow, while simultaneously the fourth lens unit L4 moves to compensate for the image shift with the variation of magnification.

For a high zoom ratio as in the present embodiment, it is on the telephoto side that the diopter of the viewfinder comes to vary with variation of the object distance.

So, in the present embodiment, the fourth lens unit is made axially movable for correcting the variation of the diopter of the viewfinder with focusing.

For the fourth lens unit, as shown in FIG. 11, a solid line curve 4a and a dashed line curve 4b are loci of zooming movements from the wide-angle end to the telephoto end with an object at infinity and at the minimum distance, respectively.

As is understandable from this that, in the present embodiment, the fourth lens unit is used not only for compensating for the image shift with zooming but also for focusing. In particular, as suggested by the curves 4a and 4b of FIG. 11, the locus the fourth lens unit depicts when zooming from the wide-angle end to the telephoto end is made convex toward the object side. This implies that the space between the third and fourth lens units is effectively utilized. Thus, a shortening of the total length is advantageously achieved.

In the present embodiment, with the setting in, for example, the telephoto end, when focusing down from an infinitely distant object to an object at a shorter distance, the fourth lens unit moves axially forward as indicated by a straight line arrow 4c in FIG. 11.

In the present embodiment, an additional or fifth lens unit L5 of negative refractive power is used as arranged behind the fourth lens unit L4 to thereby form the objective lens LO to the telephoto type. This assures simultaneous fulfillment of the requirements of shortening the total length to a minimum and of correcting aberrations well, particularly chromatic aberrations.

In the present embodiment, the first lens unit L1 is constructed with three lenses, as comprising, from front to rear, a negative lens of meniscus form convex toward the object side and two positive lenses of bi-convex form. With this, for the telephoto side, longitudinal chromatic aberration and lateral chromatic aberration and further spherical aberration are corrected well.

The second lens unit L2 is constructed with two negative lenses of bi-concave form. With this, distortion for the wide-angle side and spherical aberration and coma for the telephoto side are corrected well.

The third lens unit L3 is constructed in the single form with a positive lens of bi-convex form, the fourth lens unit L4 is constructed in the single form with a positive lens of bi-convex form, and the fifth lens unit L5 is constructed in the single form with a negative lens of bi-concave form. With this, the lens structure is simplified and, nonetheless, the range of variation of aberrations with zooming is lessened to obtain a high optical performance. As the first lens unit has a positive lens made from a glass material and a positive lens made from a plastic material, and the second lens unit has its lenses made from plastic material, another advantage is produced that the optical characteristics, for example, the diopter on the telephoto side, are made to vary to a minimum extent with variation of the ambient temperature in such a manner that the entire lens system gets lighter in weight.

In FIG. 12, the objective lens LO is constructed with six lens units, as comprising a stationary first lens unit L1 of positive refractive power, a second lens unit L2 of negative refractive power for varying the magnifying power, a third lens unit L3 of negative refractive power, a fifth lens unit L5 of positive refractive power, the third and fifth lens units L3 and L5 being movable for compensating for the image shift with zooming and for focusing, a stationary fourth lens unit L4 of positive refractive power, and a stationary sixth lens unit L6 of negative refractive power.

In the present embodiment, when the photographic lens (not shown) is zoomed from the wide-angle end to the telephoto end, the second lens unit L2 correspondingly moves axially toward the image side, while simultaneously the third and fifth lens units L3 and L5 move to compensate for the image shift with zooming.

As the zoom ratio becomes so high as in the present embodiment, it results on the telephoto side that the diopter of the viewfinder varies with variation of the object distance.

In the present embodiment, therefore, the third and fifth lens units are made axially movable for correcting the variation of the diopter of the viewfinder with focusing.

Though, in the present embodiment, the third and fifth lens units are made to move in unison when zooming and when focusing, these lens units may otherwise be moved in differential relation from each other.

As shown in FIG. 12, a solid line curve $3a$ and a dashed line curve $3b$ for the third lens unit and a solid line curve $5a$ and a dashed line curve $5b$ for the fifth lens unit are loci of zooming movements from the wide-angle end to the telephoto end with an object at infinity and at the minimum distance, respectively.

Since, in the present embodiment, the third and fifth lens units are used to compensate for the image shift with zooming and also to effect focusing and particularly since, as suggested by the curves $3a$, $3b$, $5a$ and $5b$ in FIG. 12, the loci they depict when zooming from the wide-angle end to the telephoto end are made convex toward the object side. The spaces between the second and third lens units and between the fourth and fifth lens units are thus effectively utilized to achieve a shortening of the total length advantageously.

In the present embodiment, with the setting in, for example, the telephoto end, when focusing down from an infinitely distant object to an object at a shorter distance, the third and fifth lens units move axially forward as indicated by straight line arrows $3c$ and $5c$ in FIG. 12.

In the present embodiment, when compensating for the image shift with zooming, the third lens unit of negative refractive power and the fifth lens unit of positive refractive power are used to produce an advantage that the zooming range is increased with the limitation of the range of zooming movement to a minimum. Another advantage produced is that the spherical aberration and coma are corrected well over the entire zooming range by the third lens unit of negative refractive power.

In the present embodiment, the first lens unit L1 is constructed with three lenses, as comprising, from front to rear, a negative lens of meniscus form convex toward the object side and two positive lenses of bi-convex form. With this, for the telephoto side, longitudinal chromatic aberration and lateral chromatic aberration and further spherical aberration are corrected well.

The second lens unit L2 is constructed with two negative lenses of bi-concave form. With this, distortion for the wide-angle side and spherical aberration and coma for the telephoto side are corrected well.

The third lens unit L3 is constructed in the single form with a negative lens, the fourth lens unit L4 in the single form with a positive lens of bi-convex form, the fifth lens unit L5 in the single form with a positive lens of bi-convex form and the sixth lens unit L6 in the single form with a negative lens of bi-concave form. With this, the lens structure is simplified and, nonetheless, the range of variation of aberrations with zooming is lessened to obtain a high optical performance. As the first lens unit has a positive lens made from a glass material and a positive lens made from a plastic material, and the second lens unit has its lenses made from plastic material, another advantage is produced that the optical characteristics, for example, the diopter on the telephoto side, are made to vary to a minimum extent with variation of the ambient temperature in such a manner that the entire lens system gets lighter in weight.

The variable magnification viewfinder optical system the invention aims at is achieved by setting forth the rules of design for the various parameters as described above. To achieve further improvements, it is recommended to satisfy the following condition:

$$0.4 < |f2/fw| < 0.6 \ldots \quad (5)$$

where f2 is the focal length of the second lens unit and fw is the shortest focal length of the objective lens.

The inequalities of condition (5) are for achieving a great increase of the zoom ratio, while still permitting the total length of the objective lens to be shortened. When the lower limit of the condition (5) is exceeded, as this means that the refractive power of the second lens unit is too strong, the total length gets shorter, but the variation with zooming of aberrations, particularly field curvature and distortion, increases objectionably.

When the refractive power of the second lens unit is too weak as exceeding the upper limit of the condition (5), it becomes easier to correct the variation of aberrations with zooming, but the total length gets longer and the effective diameter of the first lens unit comes to increase largely. So, it should be avoided.

It is to be noted that in the camera having the variable magnification viewfinder optical system of the invention incorporated therein, the photographic lens is formed in a similar type to that of the variable magnification viewfinder optical system, wherein the variator lens unit of the photographic lens is operatively connected by a mechanism to the second lens unit (the lens unit for varying the magnifying power) of the viewfinder optical system, and the compensator lens unit of the photographic lens is operatively connected by the mechanism to the lens unit or units for compensating the image shift with zooming of the viewfinder optical system, whereby, without providing for the variable magnification viewfinder optical system with any drive means, zooming and focusing are carried out by utilizing the drive means of the photographic lens.

In particular, the zooming or focusing movements for each pair of lens units in the zoom sections of the photographic lens and the viewfinder optical system are made almost equal to each other, thereby achieving simplification of the mounting mechanism for the viewfinder.

Next, numerical examples 4 to 7 of the invention are shown. In the numerical data for the examples 4 to 7, Ri is the radius of curvature of the i-th lens surface, when counted from the object side, Di is the i-th lens thickness or air separation, when counted from the object side and Ni and υi are respectively the refractive index and Abbe number of the material of the i-th lens element, when counted from the object side.

The shape of an aspheric surface is expressed in the coordinates with an X axis in the axial direction and an H axis in the perpendicular direction to an optical axis, the direction in which light advances being taken as positive, by the following equation:

$$X = \frac{(1/R)H^2}{1 + \sqrt{1 - (1+K)(H/R)^2}} + BH^4 + CH^6 + DH^8 + EH^{10}$$

where R is the radius of the osculating sphere, and K, B, C, D and E are the aspheric coefficients.

Also notice that the notation: D-OX means $10^{-X}$.

Numerical Example 4:
Magnification: 0.28–1.70  2ω = 14.0° (Field Angle)

| | | | |
|---|---|---|---|
| R1 = 38.18 | D1 = 0.95 | N1 = 1.84666 | ν1 = 23.8 |
| R2 = 14.37 | D2 = 1.00 | | |
| R3 = 15.35 | D3 = 4.20 | N2 = 1.49171 | ν2 = 57.4 |
| R4 = Aspherical | D4 = 0.20 | | |
| R5 = 13.29 | D5 = 3.80 | N3 = 1.49171 | ν3 = 57.4 |
| R6 = −65.99 | D6 = Variable | | |
| R7 = −58.56 | D7 = 1.00 | N4 = 1.49171 | ν4 = 57.4 |
| R8 = Aspherical | D8 = 1.65 | | |
| R9 = −5.48 | D9 = 1.00 | N5 = 1.49171 | ν5 = 57.4 |
| R10 = 18.74 | D10 = Variable | | |
| R11 = 11.27 | D11 = 2.70 | N6 = 1.49171 | ν6 = 57.4 |
| R12 = Aspherical | D12 = Variable | | |
| R13 = 11.59 | D13 = 2.70 | N7 = 1.49171 | ν7 = 57.4 |
| R14 = −16.20 | D14 = Variable | | |
| R15 = Aspherical | D15 = 0.60 | N8 = 1.84666 | ν8 = 23.8 |
| R16 = 9.44 | D16 = 10.2 | | |
| R17 = 13.96 | D17 = 38.20 | N9 = 1.57090 | ν9 = 33.8 |
| R18 = ∞ | D18 = 2.60 | | |
| R19 = 31.66 | D19 = 2.40 | N10 = 1.49171 | ν10 = 57.4 |
| R20 = Aspherical | D20 = 23.00 | | |
| R21 = Eyepoint | | | |

| Variable | Magnification | | |
|---|---|---|---|
| Separation | 0.28 | 0.74 | 1.70 |
| D6 | 1.85 | 7.42 | 10.69 |
| D10 | 12.70 | 7.13 | 3.86 |
| D12 | 4.85 | 3.16 | 3.94 |
| D14 | 2.59 | 4.28 | 3.50 |

Factor in Condition (5):
|f2/fw| = 0.512

Aspheric Surfaces:

| No. | R | K | B |
|---|---|---|---|
| R4 | −6.087 D + 01 | 2.379 D + 01 | 3.384 D − 05 |
| R8 | 5.176 0 + 00 | −2.076 D − 01 | −1.008 D − 03 |
| R12 | 1.127 D + 01 | −2.096 D + 00 | −2.965 D − 04 |
| R15 | −1.620 D + 01 | 7.462 D + 00 | 4.127 D − 04 |
| R20 | 3.166 D + 01 | 1.335 D − 01 | −3.249 D − 05 |

| No. | C | D | E |
|---|---|---|---|
| R4 | 9.236 D − 08 | — | — |
| R8 | 6.659 D − 07 | — | — |
| R12 | 6.032 D − 06 | −2.310 D − 07 | 6.312 D − 09 |
| R15 | 9.400 D − 06 | −6.750 D − 08 | — |
| R20 | 5.921 D − 07 | −3.641 D − 09 | −1.808 D − 10 |

Numerical Example 5:
Magnification: 0.28–1.68  2ω = 14.0° (Field Angle)

| | | | |
|---|---|---|---|
| R1 = 35.85 | D1 = 0.95 | N1 = 1.84666 | ν1 = 23.8 |
| R2 = 14.89 | D2 = 0.70 | | |
| R3 = 15.24 | D3 = 4.60 | N2 = 1.49171 | ν2 = 57.4 |
| R4 = Aspherical | D4 = 0.20 | | |
| R5 = 13.48 | D5 = 3.90 | N3 = 1.49171 | ν3 = 57.4 |
| R6 = −69.50 | D6 = Variable | | |
| R7 = −53.29 | D7 = 1.00 | N4 = 1.49171 | ν4 = 57.4 |
| R8 = Aspherical | D8 = 1.65 | | |
| R9 = −6.46 | D9 = 1.00 | N5 = 1.49171 | ν5 = 57.4 |
| R10 = 14.11 | D10 = Variable | | |
| R11 = Aspherical | D11 = 2.70 | N6 = 1.49171 | ν6 = 57.4 |
| R12 = −10.39 | D12 = Variable | | |
| R13 = 12.22 | D13 = 2.40 | N7 = 1.49171 | ν7 = 57.4 |
| R14 = Aspherical | D14 = Variable | | |
| R15 = −72.48 | D15 = 1.00 | N8 = 1.84666 | ν8 = 23.8 |
| R16 = 13.53 | D16 = 13.15 | | |
| R17 = 13.96 | D17 = 38.20 | N9 = 1.57090 | ν9 = 33.8 |
| R18 = ∞ | D18 = 2.60 | | |
| R19 = Aspherical | D19 = 2.40 | N10 = 1.49171 | ν10 = 57.4 |
| R20 = −26.92 | D20 = 23.00 | | |
| R21 = Eyepoint | | | |

| Variable | Magnification | | |
|---|---|---|---|
| Separation | 0.28 | 0.71 | 1.70 |
| D6 | 1.41 | 6.89 | 10.25 |
| D10 | 14.56 | 9.08 | 5.72 |
| D12 | 6.10 | 4.22 | 5.18 |
| D14 | 2.64 | 4.32 | 3.56 |

Factor in Condition (5):
|f2/fw| = 0.512

Aspheric Surfaces:

| No. | R | K | B |
|---|---|---|---|
| R4 | −7.381 D + 01 | 3.733 D + 01 | 2.598 D − 05 |
| R8 | 5.002 D + 00 | 4.460 D − 02 | −2.701 D − 04 |
| R11 | 2.060 D + 01 | −9.018 D − 01 | −2.387 D − 04 |
| R14 | −1.844 D + 01 | 7.462 D + 00 | 2.605 D − 06 |
| R19 | 3.166 D + 01 | 1.335 D − 01 | −3.249 D − 05 |

| No. | C | D | E |
|---|---|---|---|
| R4 | 2.056 D − 07 | — | — |
| R8 | −4.268 D − 05 | — | — |
| R11 | 9.369 D − 06 | −2.310 D − 07 | 6.312 D − 09 |
| R14 | 5.499 D − 06 | −6.750 D − 08 | — |
| R19 | 5.921 D − 07 | −3.641 D − 09 | −1.808 D − 10 |

Numerical Example 6:
Magnification: 0.29–1.74  2ω = 13.9° (Field Angle)

| | | | |
|---|---|---|---|
| R1 = 37.44 | D1 = 0.90 | N1 = 1.84666 | ν1 = 23.8 |
| R2 = 16.22 | D2 = 0.85 | | |
| R3 = 19.32 | D3 = 4.10 | N2 = 1.49171 | ν2 = 57.4 |
| R4 = Aspherical | D4 = 0.20 | | |
| R5 = 12.98 | D5 = 4.20 | N3 = 1.51633 | ν3 = 64.2 |
| R6 = −101.40 | D6 = Variable | | |
| R7 = −33.93 | D7 = 1.00 | N4 = 1.49171 | ν4 = 57.4 |
| R8 = Aspherical | D8 = 1.65 | | |
| R9 = −6.26 | D9 = 1.00 | N5 = 1.49171 | ν5 = 57.4 |
| R10 = 11.27 | D10 = Variable | | |
| R11 = 25.00 | D11 = 1.00 | N6 = 1.49171 | ν6 = 57.4 |
| R12 = 20.00 | D12 = Variable | | |
| R13 = Aspherical | D13 = 2.30 | N7 = 1.49171 | ν7 = 57.4 |
| R14 = −11.38 | D14 = Variable | | |
| R15 = 13.33 | D15 = 2.20 | N8 = 1.49171 | ν8 = 57.4 |
| R16 = Aspherical | D16 = Variable | | |
| R17 = −32.35 | D17 = 1.00 | N9 = 1.58306 | ν9 = 30.2 |
| R18 = 10.11 | D18 = 13.79 | | |
| R19 = 13.00 | D19 = 36.30 | N10 = 1.52540 | ν10 = 56.3 |
| R20 = ∞ | D20 = 2.60 | | |
| R21 = Aspherical | D21 = 2.40 | N11 = 1.49171 | ν11 = 57.4 |
| R22 = −27.85 | D22 = 23.00 | | |
| R23 = Eyepoint | | | |

| Variable | Magnification | | |
|---|---|---|---|
| Separation | 0.29 | 0.73 | 1.74 |
| D6 | 1.18 | 6.66 | 10.02 |
| D10 | 12.53 | 5.39 | 2.78 |
| D12 | 2.20 | 3.86 | 3.11 |
| D14 | 5.22 | 3.56 | 4.31 |
| D16 | 2.64 | 4.30 | 3.55 |

-continued

Factor in Condition (5):
|f2/fw| = 0.503

Aspheric Surfaces:

| No. | R | K | B |
|---|---|---|---|
| R4 | −6.030 D + 01 | 1.847 D + 01 | 1.797 D − 05 |
| R8 | 6.105 D + 00 | −4.565 D − 02 | −6.537 D − 04 |
| R13 | 1.268 D + 01 | 6.630 D − 01 | −3.051 D − 04 |
| R16 | −2.391 D + 01 | 7.462 D + 00 | 1.434 D − 04 |
| R21 | 3.047 D + 01 | −1.107 D + 00 | −3.594 D − 05 |

| No. | C | D |
|---|---|---|
| R4 | 1.439 D − 07 | −7.485 D − 10 |
| R8 | −3.877 D − 05 | — |
| R13 | 3.431 D − 06 | −6.000 D − 08 |
| R16 | 1.978 D − 05 | −1.261 D − 06 |
| R21 | 1.099 D − 06 | −1.970 D − 08 |

Numerical Example 7:
Magnification: 0.28–1.67    2ω = 14.0° (Field Angle)

| | | | |
|---|---|---|---|
| R1 = 35.85 | D1 = 0.95 | N1 = 1.84666 | ν1 = 23.8 |
| R2 = 14.89 | D2 = 0.70 | | |
| R3 = 15.24 | D3 = 4.60 | N2 = 1.49171 | ν2 = 57.4 |
| R4 = Aspherical | D4 = 0.20 | | |
| R5 = 13.48 | D5 = 3.90 | N3 = 1.49171 | ν3 = 57.4 |
| R6 = −69.50 | D6 = Variable | | |
| R7 = −53.29 | D7 = 1.00 | N4 = 1.49171 | ν4 = 57.4 |
| R8 = Aspherical | D8 = 1.65 | | |
| R9 = −6.46 | D9 = 1.00 | N5 = 1.49171 | ν5 = 57.4 |
| R10 = 14.11 | D10 = Variable | | |
| R11 = 25.00 | D11 = 1.00 | N6 = 1.49171 | ν6 = 57.4 |
| R12 = 20.00 | D12 = Variable | | |
| R13 = Aspherical | D13 = 2.30 | N7 = 1.49171 | ν7 = 57.4 |
| R14 = −9.80 | D14 = Variable | | |
| R15 = 13.10 | D15 = 2.40 | N8 = 1.49171 | ν8 = 57.4 |
| R16 = Aspherical | D16 = Variable | | |
| R17 = −72.48 | D17 = 1.00 | N9 = 1.84666 | ν9 = 23.8 |
| R18 = 13.53 | D18 = 12.97 | | |
| R19 = 13.96 | D19 = 38.20 | N10 = 1.57090 | ν10 = 33.8 |
| R20 = ∞ | D20 = 2.60 | | |
| R21 = Aspherical | D21 = 2.40 | N11 = 1.49171 | ν11 = 57.4 |
| R22 = −26.92 | D22 = 23.00 | | |
| R23 = Eyepoint | | | |

| Variable | Magnification | | |
|---|---|---|---|
| Separation | 0.28 | 0.71 | 1.67 |
| D6 | 1.41 | 6.98 | 10.25 |
| D10 | 12.53 | 5.28 | 2.77 |
| D12 | 2.20 | 3.88 | 3.12 |
| D14 | 5.51 | 3.83 | 4.59 |
| D16 | 2.64 | 4.33 | 3.56 |

Factor in Condition (5):
|f2/fw| = 0.512

Aspheric Surfaces:

| No. | R | K | B |
|---|---|---|---|
| R4 | −7.381 D + 01 | 3.733 D + 01 | 2.598 D − 05 |
| R8 | 5.002 D + 00 | 4.460 0 − 02 | −2.701 D − 04 |
| R13 | 1.579 D + 01 | 1.081 D + 00 | −3.136 D − 04 |
| R16 | −2.561 D + 01 | 7.462 D + 00 | 1.343 D − 04 |
| R21 | 3.166 D + 01 | 1.335 D − 01 | −3.249 D − 05 |

| No. | C | D | E |
|---|---|---|---|
| R4 | 2.056 D − 07 | — | — |
| R8 | −4.633 D − 05 | — | — |
| R13 | 7.052 D − 06 | −2.310 D − 07 | 6.312 D − 09 |
| R16 | 3.811 D − 06 | −6.750 D − 08 | — |
| R21 | 5.921 D − 07 | −3.641 D − 09 | −1.808 D − 10 |

According to the invention, by setting forth the rules of design for the constituent lenses of the objective lens having the section for varying the magnifying power as described above, it is made possible to achieve a real image type variable magnification viewfinder optical system which is relatively simple in lens structure, and has as high a zoom ratio as 3 to 6 or thereabout, while still maintaining good stability of high optical performance throughout the entire zooming range and, therefore, which is suited to be used in, for example, the still camera or video camera.

What is claimed is:

1. A variable magnification viewfinder comprising an objective lens unit consisting of, from front to rear, a first lens unit having a positive refractive power and composed of a single lens element, a second lens unit having a negative refractive power and composed of a single lens element, a third lens unit having a positive refractive power and composed of a single lens element and a fourth lens unit having a positive refractive power and composed of a single lens element, wherein zooming is performed by axially moving said second lens unit and said third lens unit.

2. A variable magnification viewfinder according to claim 1, further comprising an image re-forming lens unit for re-forming an image formed by said first to fourth lens units.

3. A variable magnification viewfinder according to claim 1, satisfying the following conditions:

$$1.2 < |f2/f0| < 1.7$$

$$0.4 < f3/f4 < 0.6$$

where f0 is the overall focal length in a wide-angle end of said first to fourth lens units, and f2, f3 and f4 are the focal lengths of said second, third and fourth lens units, respectively.

4. A variable magnification viewfinder according to claim 2, wherein said image re-forming lens unit has an erector lens for re-forming the image and a field lens, and said erector lens comprises a negative lens and a positive lens, satisfying the following condition:

$$\upsilon_{LFN} < 35$$

where $\upsilon_{LFN}$ is the Abbe number of the material of said negative lens.

5. A variable magnification viewfinder according to claim 2, further comprising an eyepiece lens unit for observing a second image formed by said image re-forming lens unit.

6. A variable magnification viewfinder according to claim 5, wherein said image re-forming lens unit has an erector lens for re-forming the image and a field lens, satisfying the following condition:

$$0.2 < DL/fe < 0.4$$

where DL is the distance from a lens surface on an observation side of said field lens to a focal plane on which said second image is formed, and fe is the focal length of said eyepiece lens unit.

7. A variable magnification viewfinder according to claim 4 or 6, wherein the single lens element of said fourth lens unit and said field lens are made of the same material and have the same form.

* * * * *

UNITED STATES PATENT AND TRADEMARK OFFICE
CERTIFICATE OF CORRECTION

PATENT NO. : 5,774,275

DATED : June 30, 1998

INVENTOR(S) : Hiroyuki HAMANO

Page 1 of 3

It is certified that error appears in the above-identified patent and that said Letters Patent is hereby corrected as shown below:

COLUMN 1:

Line 64, "the video" should read --video--.

COLUMN 2:

Line 52, "shows" should read --show--.
   Line 55, "shows" should read --show--.
   Line 58, "shows-graphic" should read --show graphic--.
   Line 61, "shows" should read --show--.
   Line 65, "shows" should read --show--.

COLUMN 3:

Line 1, "shows" should read --show--.
   Line 4, "shows" should read --show--.
   Line 7, "shows-graphic" should read --show graphic--.
   Line 10, "shows" should read --show--.
   Line 18, "shows" should read --show--.
   Line 21, "shows" should read --show--.
   Line 24, "shows" should read --show--.
   Line 27, "shows" should read --show--.
   Line 31, "shows" should read --show--.
   Line 34, "shows" should read --show--.
   Line 37, "shows" should read --show--.

UNITED STATES PATENT AND TRADEMARK OFFICE
CERTIFICATE OF CORRECTION

PATENT NO.   :   5,774,275

DATED        :   June 30, 1998

INVENTOR(S)  :   Hiroyuki HAMANO

It is certified that error appears in the above-identified patent and that said Letters Patent is hereby corrected as shown below:

<u>COLUMN 3</u>

Line 40, "shows" should read --show--.
    Line 43, "shows" should read --show--.
    Line 46, "shows" should read --show--.
    Line 50, "shows" should read --show--.
    Line 53, "shows" should read --show--.

<u>COLUMN 5</u>:

Line 8, "of" should read --f0--.
    Line 40, "too" should read --too much--.
    Line 43, "too" should read --too much--.
    Line 55, "$\nu_{LEN}$" Should read --$\nu_{LFN}$--.

<u>COLUMN 7</u>:

Line 7, "$\nu2=57.4.$" should read --$\nu2=57.4$--.

<u>COLUMN 8</u>:

Line 13, "-1.196D+0D" should read ---1.196D+00--.

UNITED STATES PATENT AND TRADEMARK OFFICE
CERTIFICATE OF CORRECTION

PATENT NO.   :  5,774,275
DATED        :  June 30, 1998
INVENTOR(S)  :  Hiroyuki HAMANO It is certified that error appears in the above-identified patent and that said Letters Patent is hereby corrected as shown below:

COLUMN 10:

Line 1, "that" should be deleted.

Signed and Sealed this

Sixth Day of July, 1999

Q. TODD DICKINSON

Attest:

Attesting Officer

Acting Commissioner of Patents and Trademarks